United States Patent [19]

Yasillo

[11] 4,103,310

[45] Jul. 25, 1978

[54] MULTIPLE-IMAGE OSCILLOSCOPE CAMERA

[75] Inventor: Nicholas J. Yasillo, Tinley Park, Ill.

[73] Assignee: The United States of America as represented by the United States Department of Energy, Washington, D.C.

[21] Appl. No.: 763,166

[22] Filed: Jan. 27, 1977

[51] Int. Cl.[2] .................. G03B 29/00; G03B 35/00
[52] U.S. Cl. .................................. 354/120; 354/76; 346/110 R
[58] Field of Search .............. 354/76, 81, 120, 121, 354/123, 125, 161, 122; 346/110 R; 355/72

[56] References Cited

U.S. PATENT DOCUMENTS

| Re. 27,739 | 8/1973 | Pedersen | 354/120 |
|---|---|---|---|
| 818,136 | 4/1906 | Woodall | 354/161 |
| 3,984,850 | 10/1976 | Bley | 354/125 |

Primary Examiner—Michael L. Gellner
Attorney, Agent, or Firm—Dean E. Carlson; Frank H. Jackson; Donald P. Reynolds

[57] ABSTRACT

An optical device for placing automatically a plurality of images at selected locations on one film comprises a stepping motor coupled to a rotating mirror and lens. A mechanical connection from the mirror controls an electronic logical system to allow rotation of the mirror to place a focused image at the desired preselected location. The device is of especial utility when used to place four images on a single film to record oscilloscope views obtained in gamma radiography.

3 Claims, 5 Drawing Figures

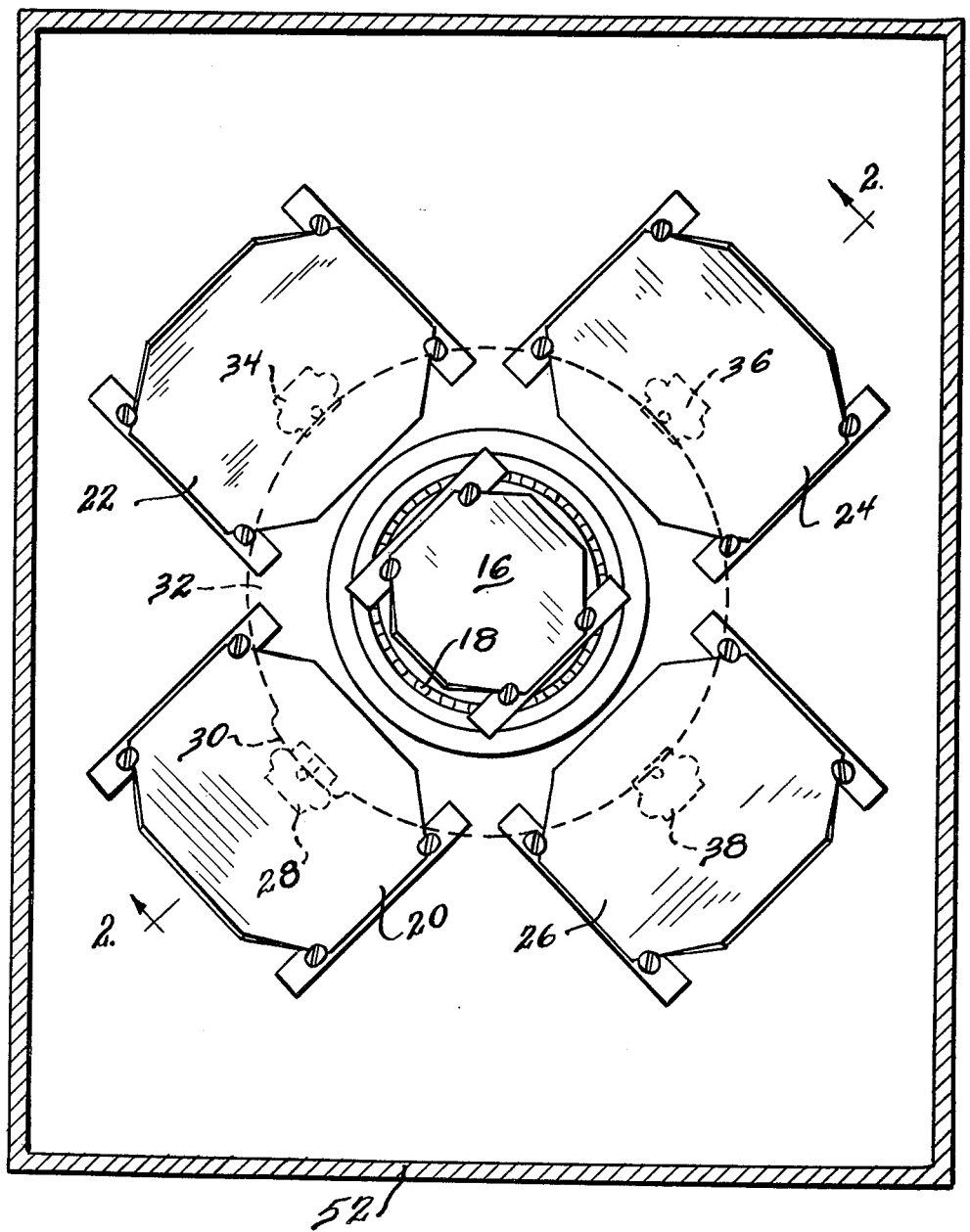
Fig—1

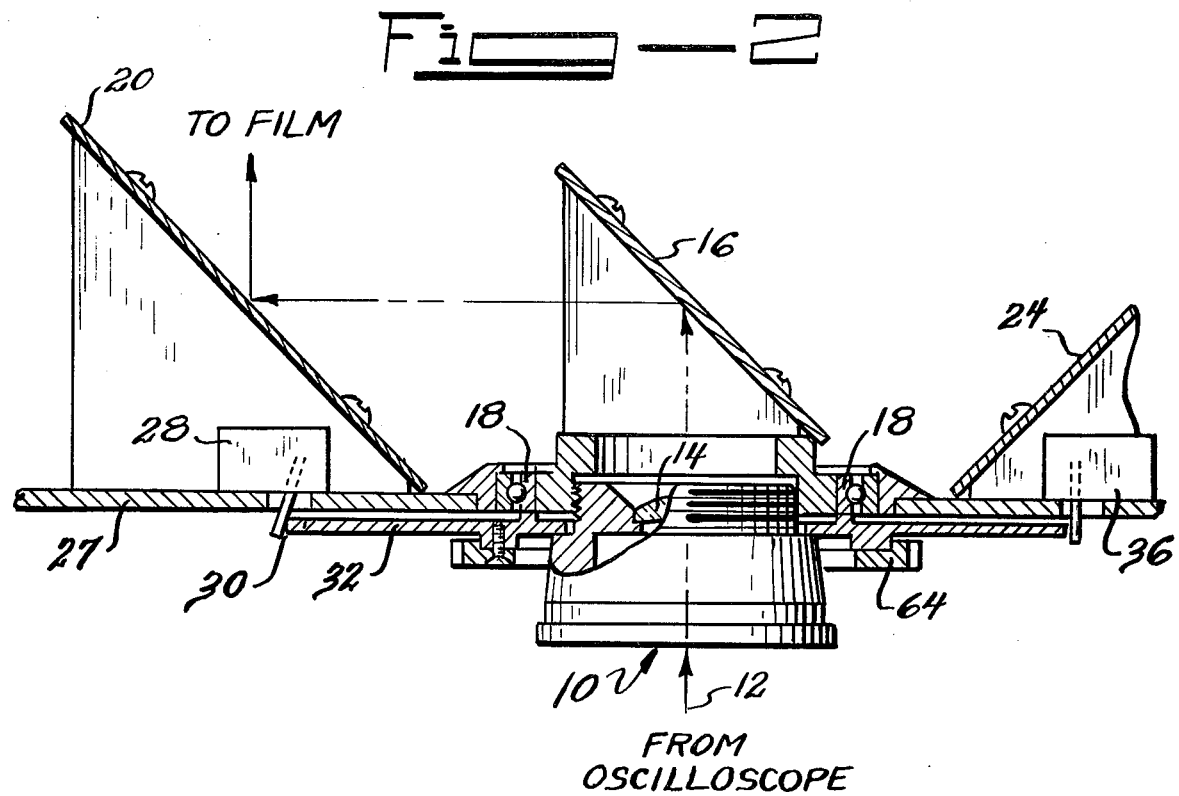
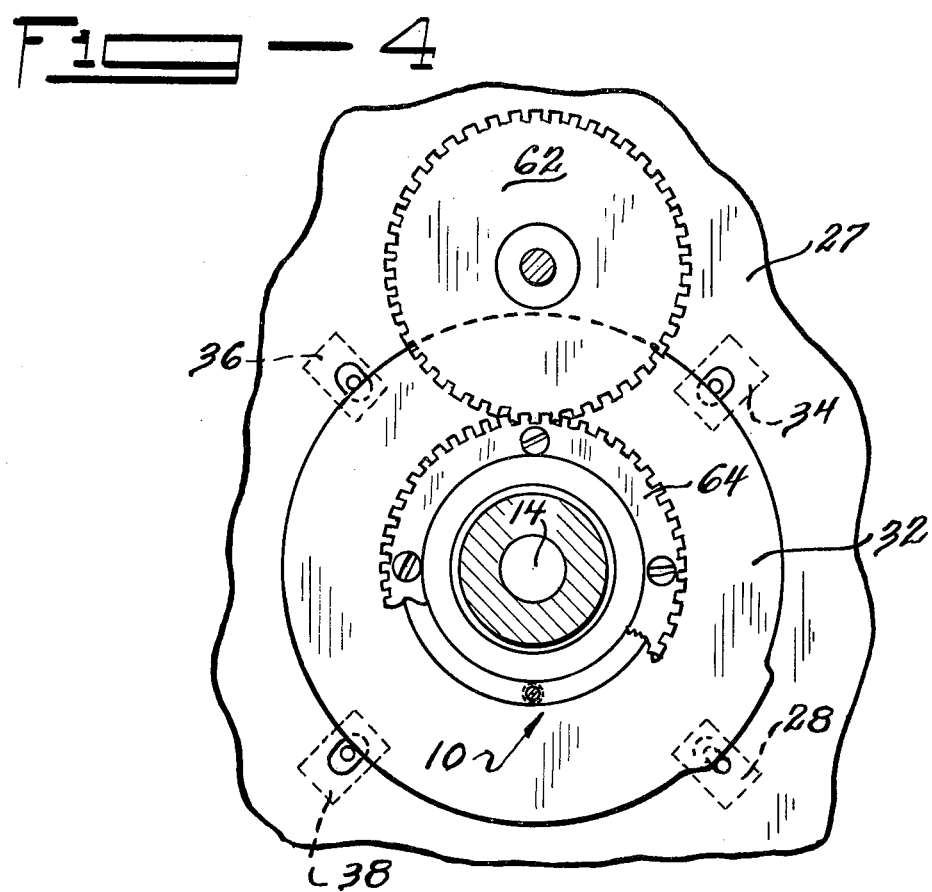

4,103,310

MULTIPLE-IMAGE OSCILLOSCOPE CAMERA

CONTRACTUAL ORIGIN OF THE INVENTION

The invention described herein was made in the course of, or under, a contract with the United States Energy Research and Development Administration.

BACKGROUND OF THE INVENTION

This invention relates to cameras for gamma radiography and more particularly to those cameras adapted to record images from oscilloscopes.

The development of diagnostic radiological images from the radiation emitted by radioactive isotopes normally requires some form of intermediate device to develop an image. This follows from the fact that gamma rays are not readily focused to develop an image on film. It is ordinarily necessary to use some form of scanning means and to display the results thus obtained on an apparatus such as an oscilloscope. A photograph is then obtained of the picture on the oscilloscope screen and this photograph becomes the record of the diagnostic information.

Two possible situations exist in which it is desirable to place a plurality of images on a single piece of sheet film. The first situation is one in which it is desired to take multiple views of a single subject. It is then convenient to have the multiple views together on a single film and it is also convenient to be able to vary the location of the film exposure without making a change in film cassettes or plate holders. The second such situation is one in which it is desired to obtain multiple radiographic images in a short time, of the order of seconds or even fractions of a second.

It is an object of the present invention to provide a better method of obtaining multiple images from an oscilloscope camera.

It is a further object of the present invention to provide a method and means for exposing a plurality of images on a single sheet of film.

Other objects will become apparent in the course of a detailed description.

BRIEF DESCRIPTION OF THE DRAWINGS

FIG. 1 is a view of the back of the optical device of the present invention.

FIG. 2 is a partial sectional view along section lines 2—2 of FIG. 1.

FIG. 4 is a sectional view along section line 4—4 of FIG. 3.

DETAILED DESCRIPTION OF THE PREFERRED EMBODIMENT

Figure 3:
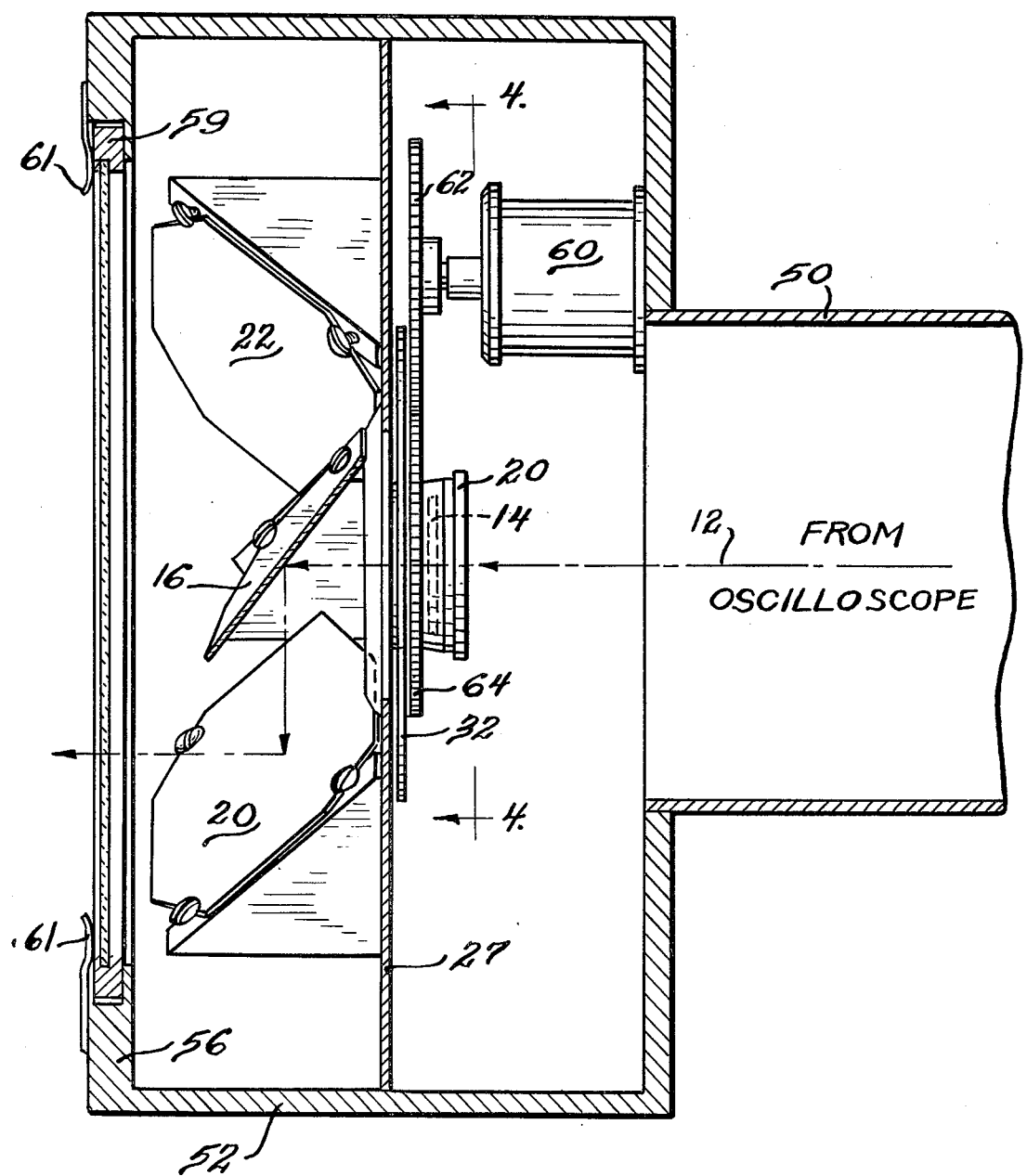
FIG. 3 is a sectional side view of the optical device along section lines 3—3 of FIG. 1.

FIG. 1 is an end view of the optical device of the present invention taken from the back and FIG. 2 is a sectional view taken along section lines 2—2 of FIG. 1. In FIGS. 1 and 2, light from an oscilloscope enters lens hood 10 along axis 12 and passes through lens 14. The oscilloscope is typically used as a display device for various scanning cameras such as an Anger camera. The light strikes rotating mirror 16 which is mounted on ball bearings 18 to reflect light from the oscilloscope at one of the fixed mirrors 20, 22, 24, and 26. Rotating mirror 16 and fixed mirrors 20, 22, 24, and 26 are attached to partition 27 and are all disposed at an angle of approximately 45° with respect to axis 12 so that light reflected from rotating mirror 16 is reflected again from one of the fixed mirrors 20, 22, 24, and 26 into a path parallel to axis 12 for focusing on a film. Selection of the particular portion of the film to be used is determined by positioning rotating mirror 16 to reflect light from a particular one of fixed mirrors 20, 22, 24, and 26. In FIGS. 1 and 2, rotating mirror 16 has been stopped to focus light at fixed mirror 20 by microswitch 28 actuated by a detent 30 on cam wheel 32. Microswitch 34 is positioned similarly to stop the rotation of mirror 16 at fixed mirror 22; microswitch 36, at fixed mirror 24; and microswitch 38, at fixed mirror 26. It is apparent in FIG. 2 that microswitch 36 has not been caused to operate because there is no detent or other switch actuator on cam wheel 32 at microswitch 36 in the position of rotating mirror 16 that is shown there.

Further understanding of the invention may be had from FIGS. 3 and 4. FIG. 3 is a sectional side view of the structure of FIG. 1 taken along section lines 3—3 of FIG. 1 and FIG. 4 is a sectional side view of a portion of the structure of FIG. 3 taken along section lines 4—4. In FIG. 3, light from an oscilloscope follows a path along axis 12 through lens hood 10 and lens 14 to rotating mirror 16 from which it is reflected to fixed mirror 20. Barrel 50 is a conventional mount to an oscilloscope which provides structural support for the device as well as excluding stray light. Barrel 50 is connected to frame 52 which supports partition 27 and back 56. A ground glass 58 is shown in place for focusing images as part of a setup procedure. Ground glass 58 is mounted in camera back 59, which is held in place by springs 61. In normal operation, ground glass 58 would then be displaced against springs 61 by insertion of any conventional cassette or film holder for holding cut, plate, or roll film.

Fixed mirrors 20 and 22 are attached in rigid engagement to partition 27 which also provides support for rotary motion of rotating mirror 16. Frame 52 supports stepping motor 60 which drives gear 62. Gear 64 is connected in rigid engagement to rotating mirror 16 and is connected in toothed engagement with gear 62. Cam wheel 32 is attached to and is driven by gear 64. Detent 30, visible in FIG. 4, generates a signal to stop the stepping motor 60 when a desired position is achieved.

Figure 5:
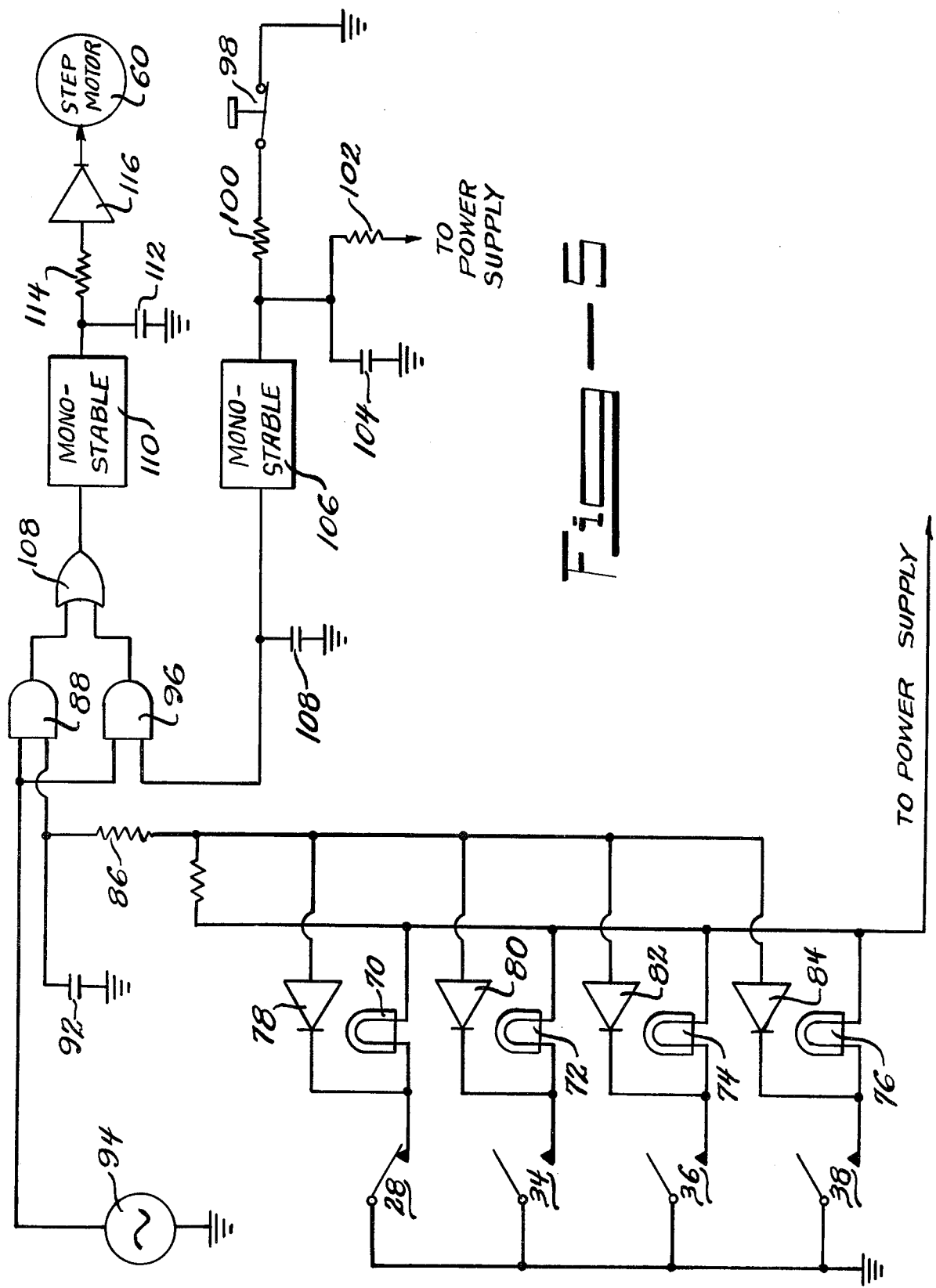
FIG. 5 is a modified block diagram showing an electronic circuit for controlling the motion of the optical device.

Control of the operation of the invention is achieved by the electronic circuit of FIG. 5. In FIG. 5, the four microswitches 28, 34, 36, and 38 are shown with microswitch 28 closed and the others open. This causes pilot light 70 to be lit while pilot lights 72, 74, and 76 remain dark. Diodes 78, 80, 82, and 84 are connected to couple an appropriate stopping signal from microswitches 28, 34, 36 and 38 through resistor 86 to gate 88. Resistor 90 is connected to a power supply to apply a bias voltage to gate 88 when all microswitches 28, 34, 36, and 38 are open. Capacitor 92 smooths switching transients. A pulse generator 94 is connected to an input to gate 88 and also supplies an input to gate 96. A second input to gate 96 is initiated by start switch 98 which applies a change in the voltage from a power supply through a dropping and decoupling network including resistors 100 and 102 and decoupling capacitor 104. This applies a signal from start switch 98 to monostable 106. The output of monostable 106, smoothed by capacitor 108, is also connected to gate 96. The outputs of gates 88 and 96 are taken as inputs to OR gate 108 which is coupled to monostable 110. The output of monostable 110, filtered by capacitor 112, is connected through resistor 114 to amplifier 116 to drive stepping motor 60.

Operation of the circuit of FIG. 5 is best characterized in three stages, denoted hold, start, and run. In the hold stage one of the microswitches 28, 34, 36, or 38 is closed. This applies a signal to AND gate 88 in a polarity that is appropriate to keep AND gate 88 from passing a pulse from pulse generator 94. Since nothing has caused monostable 106 to be energized, there is no signal from monostable 106 to gate 96. There is therefore no signal to trigger monostable 110 and hence no power is applied to step motor 60. Rotating mirror 16 of FIGS. 1 and 2 is thus stopped in a position to reflect light through one of the fixed mirrors 20, 22, 24, or 26.

The second phase of operation, denoted "start," is initiated by operating start switch 98. This triggers monostable 106 and enables the passage of a pulse from pulse generator 94 through gate 96. Monostable 110 is triggered as a result of that signal, causing stepping motor 60 to step. The pulse from monostable 106 was of the order of 100 milliseconds in length in an application in which this invention was used, but in any particular application for the practice of the invention it is necessary only that the pulse length of the output pulse from monostable 106 be selected so that the stepping motor causes operation long enough that whichever one of the microswitches 28, 34, 36, or 38 that was closed is opened to allow the circuit of FIG. 5 to reach the third of its three stages, the "run" stage. In the run stage, gate 88 is enabled by the signal passing through resistor 86. A pulse from pulse generator 94 is thus passed through gate 88, gate 108, and causes operation of monostable 110 to continue operation of the step motor for as long as all four microswitches 28, 34, 36, and 38 are open. When rotating mirror 16 is turned far enough to place detent 30 in position to operate another microswitch, then the circuit enters the "hold" condition described above. The stepping motor stops and the cycle of operation has been completed by the selection of a new mirror.

A circuit and apparatus for the practice of the invention has been built and used in gamma radiography at the Franklin McLean Memorial Research Institute of the University of Chicago. For such use, an image is first obtained on an oscilloscope and focused on ground glass. The oscilloscope is then blanked and a camera back containing film is placed in position for exposure. In one mode of radiography where it is desirable to have multiple views or views from different angles on the same plate or film sheet, individual exposures were obtained over a time span of the order of minutes while the subject of radiography is repositioned between exposures. In another mode of radiography, a sequence of four views was obtained consecutively in time by advancing the mirror over a time period of the order of seconds. In the circuit as constructed, the pulse generator 94 produced pulses having a width varying from 10 microseconds to 10 milliseconds at times of the order of 80 milliseconds apart. The stepping motor 60 was a 30° step motor so that three pulses of output from monostable 110 sufficed to rotate from one fixed mirror to the next. The apparatus as disclosed herein has only a single lens and uses no sliding light seals, contributing to reliability. Ease of operation is also facilitated by the fact that all moving parts rotate about axes through their centers of mass which increases the possible speed of operation and reduces vibration. In the circuit as shown in FIG. 5, a manual switch was used to start operation. It is a routine matter to replace the manual switch with an electronic switching circuit to program rotation of the lens and mirror to any desired scheme of timing or control. It is evident that any such system that results in rapid exposure will necessitate timing from outside of the oscilloscope signal. This also is a matter of routine electrical design. Scanning cameras that are available commercially typically produce control signals proportional to a predetermined number of counts. Such control signals are normally used to gate the intensity of the oscilloscope used to display the results of the scan. For this reason, no shutter or other timing control is necessary to practice the present invention, although one could readily be interposed in the optical path as a routine modification.

The embodiments of the invention in which an exclusive property or privilege is claimed are defined as follows:

1. An apparatus for placing on a single photographic film a plurality of images of discreet views of displays of an oscilloscope, the apparatus comprising:

an enclosing frame connected to the oscilloscope and adapted to receive and hold the film and forming therewith a light-tight inner region;

a lens mounted within the inner region and coupled optically to the oscilloscope display to focus light therefrom;

a rotating mirror disposed within the inner region and coupled optically to the oscilloscope display and the lens to reflect light from the display at an angle of approximately 90°;

a plurality of fixed mirrors, each one of said plurality mounted within the inner region and disposed to reflect the light reflected by the rotating mirror in one of a plurality of predetermined positions to a predetermined location on the film, the distance of light travel from the lens to the rotating mirror, to each fixed mirror and to the film being chosen to focus light from the display on the film;

a bearing connected to the enclosing frame and to the rotating mirror to permit rotation of the mirror with respect to the enclosing frame;

a stepping motor connected to the rotating mirror to rotate the rotating mirror to one of a plurality of predetermined positions;

a switch actuator coupled mechanically to the rotating mirror and responsive to the position thereof;

a plurality of switches equal in number to the plurality of fixed mirrors, each of the switches disposed to respond to the switch actuator to provide a signal indicating position of the rotating mirror;

means for producing a signal to start rotation of the mirror; and an electronic circuit connected to the plurality of switches, to the means for producing a signal to start rotation, and to the stepping motor to start the stepping motor in response to a signal from the means for producing a signal and to stop the stepping motor in response to a signal from any one of the plurality of switches.

2. The apparatus of claim 1 wherein the means for producing a signal to start rotation comprises a manually operated switch.

3. The apparatus of claim 1 wherein the means for producing a signal to start rotation comprises an electronic switching circuit generating a plurality of "start" pulses.

* * * * *